(12) United States Patent  (10) Patent No.: US 8,052,104 B2
Clampitt  (45) Date of Patent: Nov. 8, 2011

(54) MOUNTING HEAD

(75) Inventor: Darwin A. Clampitt, Wilder, ID (US)

(73) Assignee: Intuitive Corporation, Wilder, ID (US)

( * ) Notice: Subject to any disclaimer, the term of this patent is extended or adjusted under 35 U.S.C. 154(b) by 1028 days.

(21) Appl. No.: 11/638,180

(22) Filed: Dec. 13, 2006

(65) Prior Publication Data

US 2008/0142654 A1  Jun. 19, 2008

(51) Int. Cl.
*F16M 11/02*  (2006.01)
(52) U.S. Cl. .............. 248/178.1; 248/187.1; 248/176.1
(58) Field of Classification Search .............. 248/276.1, 248/287.1, 278.1, 279.1, 284.1, 282.1, 277.1, 248/178.1, 179.1, 180.1, 181.1, 183.1, 121, 248/187.1, 176.1; 396/428
See application file for complete search history.

(56) References Cited

U.S. PATENT DOCUMENTS

| 768,987 | A | * | 8/1904 | Graf | 248/171 |
|---|---|---|---|---|---|
| 799,878 | A | * | 9/1905 | Stockwell | 33/281 |
| 839,541 | A | * | 12/1906 | Berger | 248/178.1 |
| 875,034 | A | * | 12/1907 | Wright | 248/181.1 |
| 906,680 | A | * | 12/1908 | Berger | 248/180.1 |
| 918,817 | A | * | 4/1909 | Berger | 248/178.1 |
| 1,166,018 | A | * | 12/1915 | Soresi | 5/608 |
| 1,182,472 | A | * | 5/1916 | Frye | 248/180.1 |
| 1,182,881 | A | * | 5/1916 | Frye | 248/180.1 |
| 1,443,331 | A | * | 1/1923 | Meyer | 362/422 |
| 1,491,075 | A | * | 4/1924 | Batchelor | 248/180.1 |
| 2,556,598 | A |  | 6/1951 | Rasine | |
| 3,661,376 | A |  | 5/1972 | Hill et al. | |
| 3,924,828 | A |  | 12/1975 | Epperson | |
| 4,233,634 | A | * | 11/1980 | Adams | 348/373 |
| 4,249,817 | A |  | 2/1981 | Blau | |
| 4,255,036 | A | * | 3/1981 | Pincetich | 396/422 |
| 4,341,452 | A |  | 7/1982 | Korling | |
| 4,560,129 | A | * | 12/1985 | Clayton | 248/278.1 |
| 4,579,436 | A |  | 4/1986 | Jaumann | |
| 4,763,151 | A |  | 8/1988 | Klinger | |
| 4,838,117 | A |  | 6/1989 | Bittner | |
| 4,919,382 | A | * | 4/1990 | Forman | 248/178.1 |
| 5,056,745 | A |  | 10/1991 | Gelbard | |
| 5,072,907 | A |  | 12/1991 | Vogt | |
| 5,241,183 | A |  | 8/1993 | Kanai et al. | |
| 5,288,044 | A |  | 2/1994 | Chen | |
| 5,397,086 | A |  | 3/1995 | Chen | |
| 5,463,432 | A |  | 10/1995 | Kahn | |
| 5,467,157 | A |  | 11/1995 | Kaneko | |
| 5,623,709 | A |  | 4/1997 | Kaji | |
| 5,768,648 | A |  | 6/1998 | Skipp et al. | |
| 5,772,164 | A |  | 6/1998 | Shen | |
| 5,806,821 | A |  | 9/1998 | Phillips et al. | |
| 6,045,103 | A | * | 4/2000 | Costa et al. | 248/278.1 |
| 6,115,972 | A | * | 9/2000 | Tamez | 52/167.4 |
| 6,135,400 | A |  | 10/2000 | Hatti et al. | |

(Continued)

*Primary Examiner* — Kimberly T Wood
(74) *Attorney, Agent, or Firm* — TraskBritt

(57) ABSTRACT

A mounting head includes a first pivot assembly and a second pivot assembly. The first pivot assembly may be configured to pivot a platform of the mounting head about a first axis, and the second pivot assembly may be configured to pivot the platform about a second axis. A pivot assembly may comprise a threaded shaft having an attachment element configured to move linearly along the axial length of the threaded shaft as the threaded shaft is rotated. The linear movement of the attachment element may drive pivotal movement of the platform. The mounting head may further include position indicators, configured for indicating, in linear coordinates, the position of the platform. Methods of using and adjusting a mounting head are disclosed.

17 Claims, 12 Drawing Sheets

U.S. PATENT DOCUMENTS

| | | |
|---|---|---|
| 6,334,594 B1 | 1/2002 | Bailey |
| 6,354,544 B1 | 3/2002 | Muzila |
| 6,896,227 B2 | 5/2005 | Ku |
| 7,021,592 B2 | 4/2006 | Brandes |
| 2002/0084396 A1* | 7/2002 | Weaver ............... 248/278.1 |
| 2004/0206863 A1 | 10/2004 | Tillschneider |
| 2005/0001116 A1 | 1/2005 | Vogt |

* cited by examiner

MOUNTING HEAD

FIELD OF THE INVENTION

The present invention, in various embodiments, relates generally to camera and similar optical device mounts. More specifically, embodiments of the present invention relate to heads for adjustably mounting a device on a tripod or other support structure.

BACKGROUND OF THE INVENTION

Cameras and other optical devices such as scopes, binoculars, laser transits, and camcorders are often mounted on a tripod or other support by a head that enables panning by rotating about a vertical axis and tilting by rotating about a horizontal axis. Panning and tilting enable a user to search an area for a target or locate a point of interest with an optical device. Typical examples are using a telescope to locate astronomical phenomenon, using a spotting scope or binoculars to locate an animal while hunting or bird watching etc., or using a camera to find and photograph a point of interest.

Conventional tripod heads usually include a base that mounts on the tripod and a platform on which the camera or other optical device mounts. The platform may be independently positioned relative to the base by pivoting about two or three mutually perpendicular axes, which enables flexibility in aiming the optical device. Some tripod heads have a locking mechanism to lock the optical device in a desired position.

One such tripod head is described in U.S. Pat. No. 3,924,828, the head being a pan-tilt tripod head that is capable of panning, tilting, and rolling to either side about three orthogonal axes and has a locking mechanism for all three axes controlled by a single trigger. A cylindrical rotatably mounted trunnion enables the head to pan about one axis, a clamp bracket journalled on the trunnion enables the head to tilt about a second axis, and a head bracket pivotally mounted on the end of the clamp bracket enables the head to roll about a third axis.

U.S. Pat. No. 4,763,151 discloses a universal tripod head that has a base member that mounts on a tripod for pivotal movement about a panning axis and a platform on which a camera may be mounted. Components are provided that enable independent pivotal movement of the platform member about two mutually perpendicular tilting axes. A locking mechanism locks the platform against movement about both of the tilting axes by operation of a single knob.

When a point of interest is found with a conventional tripod head, it may be easily lost if the optical device is bumped or moved when in an unlocked position. Particularly when using a spotting scope for viewing a target at a great distance, even a slight shift of the scope will take the target out of the scope's field of view. The point of interest, whether a landmark or an animal, may be difficult to relocate once lost from the field of view of the optical device. To avoid losing a point of interest, most tripod heads have a lock that holds the tripod head in a desired position. However, just the act of locking the tripod head in a desired position can cause the tripod head to shift out of the desired position. Additionally, locks require time and effort that can cause a viewer to miss a photo opportunity or miss spotting an animal or other object of interest.

Various attempts have been made to provide a tripod head that cures these deficiencies. Once such example is described in U.S. Pat. No. 4,341,452 to Korling, which discloses a camera mount that is independently or simultaneously pivotable about three axes. Pivot assemblies with plastic friction washers enable the camera to be moved from one position to another, yet it will stay in the second position without needs of a locking means. However, the Korling tripod mount requires a bracket specifically designed for hand-held single lens reflex (SLR) cameras. Only hand-held SLR cameras may be properly balanced in the mount. Other optical devices may be imbalanced, causing creep from the position to which the optical device is set.

Therefore, there is a need in the art for a mount for a tripod head which may provide the capability to pan and tilt without requiring a locking mechanism.

BRIEF DESCRIPTION OF THE SEVERAL VIEWS OF THE DRAWINGS

While the specification concludes with claims particularly pointing out and distinctly claiming that which is regarded as the present invention, various features and advantages of this invention may be more readily ascertained from the following description of the invention when read in conjunction with the accompanying drawings, in which:

DETAILED DESCRIPTION OF THE INVENTION

It will be understood that the components of the present invention, as generally described and illustrated in the Figures herein, may be arranged and designed in a wide variety of different configurations. Thus, the following more detailed description of the embodiments of the apparatus and method of the present invention, as represented in FIGS. 1 through 20, is not intended to limit the scope of the invention, which is as broad as claimed herein. The illustrations merely depict embodiments of the invention. These embodiments of the invention will be best understood by reference to the drawings, wherein like parts are designated by like numerals. Those of ordinary skill in the art will, of course, appreciate that various modifications to the details of the figures may easily be made without departing from the scope of the invention.

Figure 1:
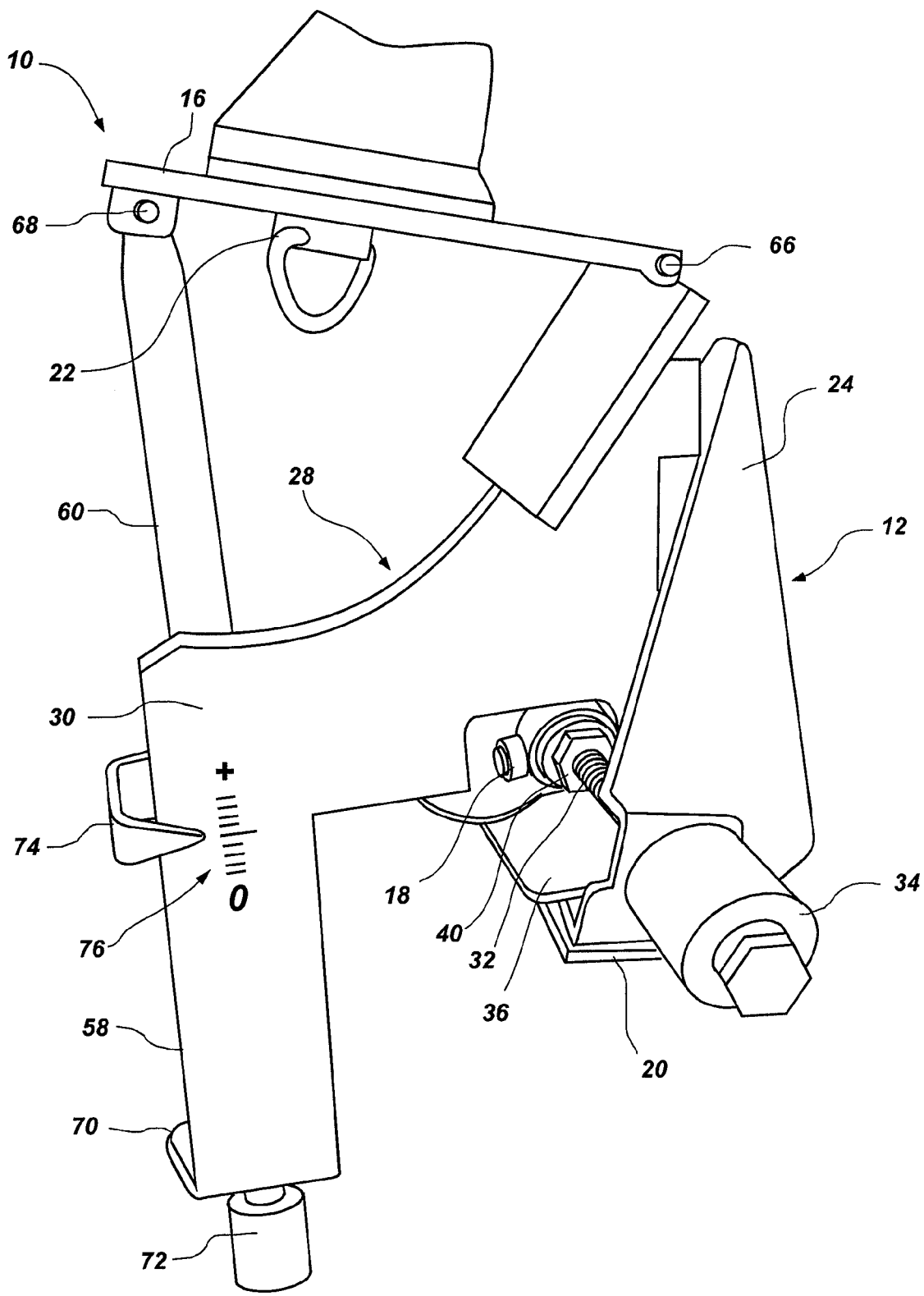
FIG. 1 is a perspective view of one embodiment of a tripod head of the present invention.
Figure 2:
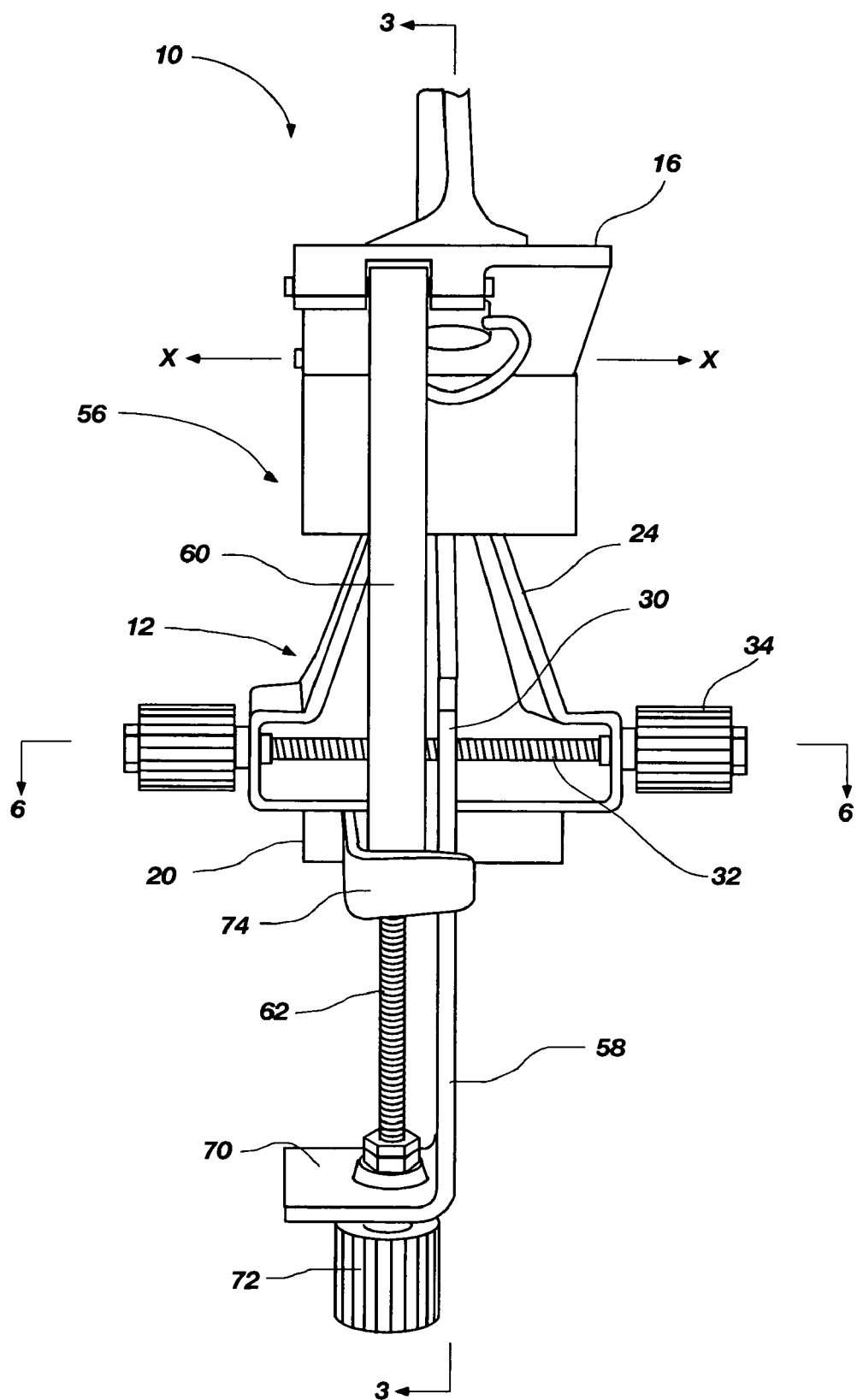
FIG. 2 is an end view of the tripod head shown in FIG. 1.

Referring to FIGS. 1 and 2, a first embodiment of tripod head 10 of the present invention is shown. The tripod head 10 may include a base 12 having a connection plate 20 configured for attachment to a tripod or other support. The base 12 may additionally include a rib 24 that extends from the connection plate 20 toward the platform 16. The rib 24 may be positionally fixed relative to the connection plate 20. Pivot assemblies 28 and 56 attached to the base 12 enable a platform 16 for an optical device, and therefore the optical device, to pivot in at least two directions with respect to the base 12.

The connection plate 20 of the base 12 may include a threaded hole (not shown) configured to receive a protruding screw of the tripod for non-permanent attachment therewith. Conventionally, the threaded hole may be configured to receive a ¼ inch or ⅜ inch camera screw. Alternatively, the connection plate 20 may include another suitable mechanism for mounting a tripod head to a tripod, such as, for example, a clamping mechanism.

The platform 16 of the tripod head 10 may be configured for supporting an optical device such as a camera, spotting scope, camcorder, telescope or the like. The platform 16 may include a universal connection 22. The universal connection 22 may include a circular hole or a slot configured to receive a commercially available camera or scope mounting plate. One suitable mounting plate is the quick release plate sold by Gruppo Manfrotto of Bassano del Grappa, Italy. Alternatively, the universal connection 22 may include a threaded screw protruding from the platform 16. For example, a ¼ or ⅜ inch camera screw mounting the optical device directly on the platform 16 may be centrally positioned on the platform 16.

The platform 16 is mounted on the base 12 with pivot assemblies 28, 56 enabling independent pivotal movement of the platform 16 about each of a first and a second mutually perpendicular tilting axis. The first tilting axis Y-Y (FIG. 3) may be a substantially vertical axis and the second tilting axis X-X (FIG. 2) may be substantially horizontal. Thus, the platform 16 and any optical device mounted on the platform 16 may be pivoted independently of the base 12 and any tripod or support structure upon which the base 12 is mounted, to a desired spatial orientation in order to view an object or point of interest.

The base 12 and the platform 16 may be formed of any suitable material. Such material may be selected for low density and high strength. Suitable materials may include a metal such as aluminum, a metal alloy, a polymer or a polymer blend.

A first pivot assembly 28 of the base 12 enables the platform 16 to pivot or pan about the first tilting axis Y-Y (FIG. 3) and a second pivot assembly 56 enables the platform 16 to pivot or tilt about the second tilting axis X-X (FIG. 2).

The pivot assemblies 28 and 56 may comprise a linear adjustment assembly which may be engaged by a user to apply a linear force on a portion of a body of the pivot assembly 28, 56. The linear force may be expressed in either pivotal or linear movement of the body, and in turn, pivotal movement of the platform 16. The linear adjustment assembly may convert rotational movement into linear movement. For example, the linear adjustment assembly may comprise a pair of components, wherein each component of the pair of components includes surface protrusions with a repeated pattern that correspond and substantially rotatably intermesh with the surface protrusions of the other component of the pair of components. Examples of such pairs of components include a jackscrew, worm gears, a rack and pinion, a ball screw, a gearbox or other such pair of components that have teeth or gears that intermesh with each other.

The pitch of the threads may be configured, as known to those of ordinary skill in the art, so that friction between engaged surfaces of components of a component pair is sufficient to prevent slipping, and the gears may be configured to reduce backlash. By using pivot assemblies with gears or threads the device may be configured to be self locking, which prevents the pivot assemblies from moving the platform 16 about either the first axis or the at least a second axis without engaging the pivot assemblies. This may be advantageous in a tripod mounting head because it prevents the head from being bumped out of position. It may also be advantageous because the tripod head does not require locks to hold the platform 16 and optical device in a particular position. Locks may require a user to initiate another task in order to engage them, and waste valuable time.

The first pivot assembly 28 may comprise a linear adjustment assembly including a body 30, a threaded rod 32, and a slide plate assembly 36, as depicted in FIGS. 1 and 2. The linear adjustment assembly depicted is a jackscrew assembly.

Figure 3:
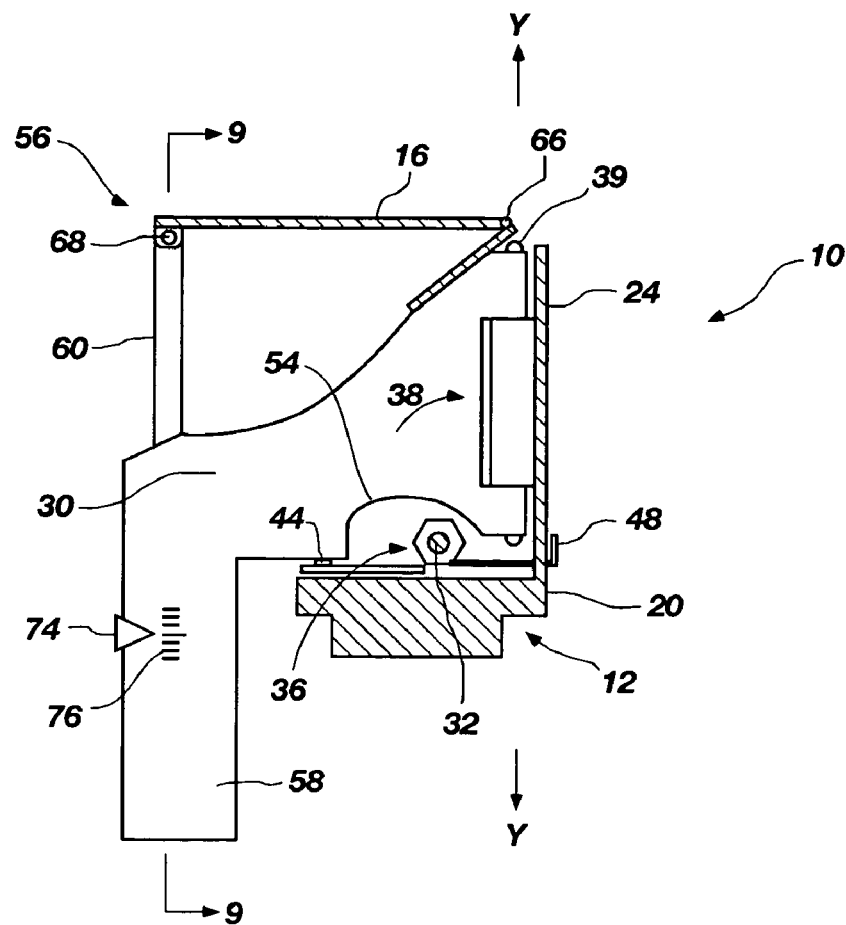
FIG. 3 is a cross-sectional view of the tripod head shown in FIGS. 1 and 2 taken along line 3-3 of FIG. 2.

The body 30 of the first pivot assembly 28, depicted in FIG. 3, may be pivotally attached to the base 12. The body 30 of the first pivot assembly 28 may pivot or rotate about the Y-Y axis. More specifically, the body 30 may include a joint 38 mounted to the rib 24 of the base 12, and the body 30 may pivot about the joint 38. The joint 38 may comprise, for example, a hinge. In this regard, the rib 24 and the body 30 may include aligned apertures disposed along the Y-Y axis to receive one or more hinge pins 39.

The body 30 may be pivotally driven by the slide plate assembly 36 which is movably mounted on the threaded rod 32, which in turn is mounted on the base 12. The slide plate assembly 36 may apply a force to the body 30 as the slide plate assembly 36 moves linearly. The body 30 pivots about the joint 38.

The threaded rod 32 of the first pivot assembly 28, as seen in FIGS. 1, 2, 5, and 6, may be coupled near each end thereof to the base 12. The threaded rod 32 may extend substantially parallel to the X-X tilting axis over the substantially planar plate 20 of the base 12. The threaded rod 32 may be rotatably coupled to the base 12 by mounts 33 comprising a bearing, bushing, or suitable rotational coupling. The threaded rod 32 may be rotated about an axis substantially parallel to the X-X axis. A knob 34 may be attached to one end of the threaded rod 32, which may be manually manipulated to rotate the threaded rod 32. Optionally, a second knob 34a may be attached to the opposite end of the threaded rod 32 from which knob 34 is attached.

Figure 5:
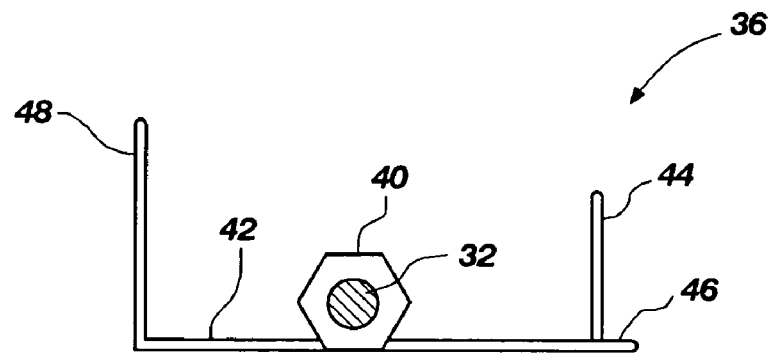
FIG. 5 is a side view of the slide plate assembly of the tripod head shown in FIGS. 1 and 3.
Figure 6:
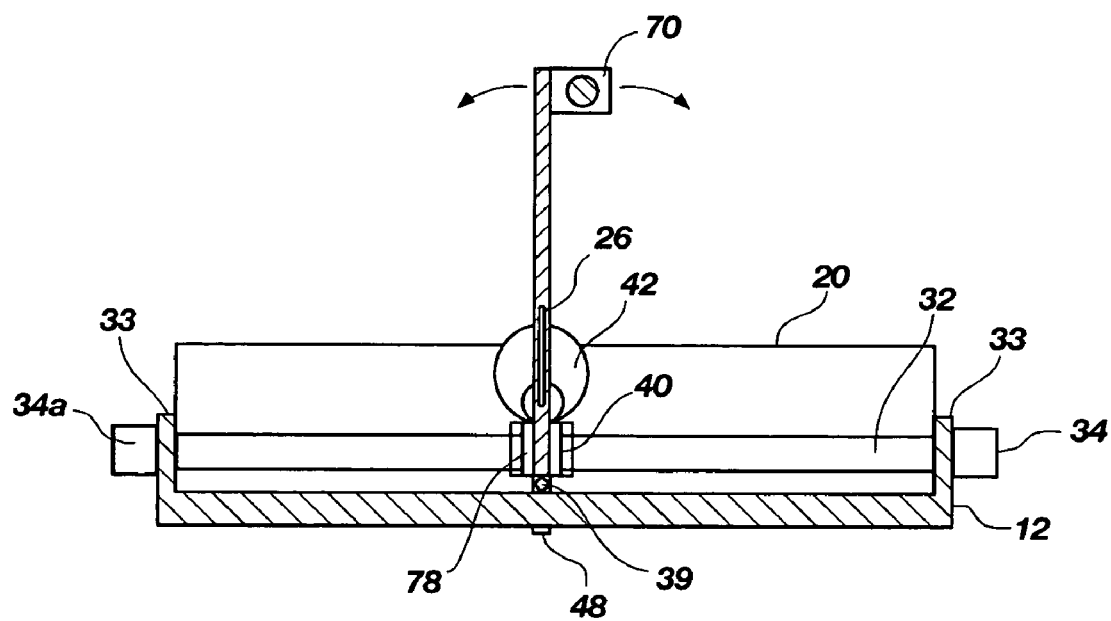
FIG. 6 is a cross-sectional view of the tripod head shown in FIGS. 1-3 taken along line 6-6 of FIG. 2.

The slide plate assembly 36, depicted in FIGS. 1, 3, 5, and 6, may include at least one attachment element 40, for example a nut, with internal threads configured to matingly engage with the threads of the threaded rod 32. The attachment element 40 is fixed from rotation with respect to the threaded rod, and as the threaded rod 32 is rotated, the attachment element 40 and thus the slide plate assembly 36 move axially along the length of the threaded rod 32. The slide plate assembly 36 may include two attachment elements 40 on either side of a frame 78, as depicted in FIG. 6. Alternatively, the frame 78 and the attachment element 40 may comprise one component. For example, the frame 78 may include a threaded aperture. The frame 78 may receive the threaded rod 32 therethrough.

Figure 4:
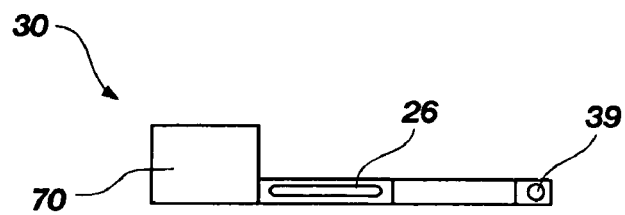
FIG. 4 is a bottom view of the body of the tripod head shown in FIGS. 1-3.

The slide plate assembly 36 may include a slide plate 42 coupled to the attachment element 40, or alternatively, the slide plate 42 may be coupled directly to the frame 78. The slide plate 42 may be substantially circular in shape as seen in FIG. 6 or may be square, rectangular or any other suitable shape. Referring to FIG. 5, the slide plate 42 may include a substantially planar surface 46 from which a pin 44 protrudes in a generally perpendicular direction. As seen in FIGS. 3 and 4, the pin 44 is received by a slot 26 of the body 30. Referring to FIGS. 5 and 6, as the slide plate assembly 36 is moved along the length of the threaded rod 32, the pin 44 urges the body 30 to pivot about the Y-Y axis. As the body 30 pivots, the pin 44 may move in the slot 26 of the body 30. The pivoting motion of the body 30 in turn rotates the platform 16.

For example, if knob 34 is rotated clockwise, the slide plate assembly 36 will be moved axially along the length of the threaded rod 32 toward knob 34a. As the slide plate assembly 36 moves toward the knob 34a, the pin 44 urges the body 30 to rotate about the joint 38. The pin 44 adjusts within the slot 26 toward the end furthest from the joint 38. As the body 30 rotates, the lateral distance from the threaded rod 32 to the slot 26, orthogonal to the Y-Y axis, changes. Thus, the pin 44 adjusts within the slot 26 as the pin 44 maintains a constant lateral distance from the threaded rod 32, and the lateral distance from the portion of the body 30 housing the slot 26 to the threaded rod changes as the body 30 rotates.

The body 30 will be displaced with respect to the connection plate 20 of the base 12 as the body 30 pivots. The body 30 extends from the rib 24 over the connection plate 20 of the base 12. The bottom portion of the body 30 directly over the connection plate 20 includes the slot 26 along its length, as seen in the underside view of FIG. 4, for engaging the slide plate assembly 36. The body 30 may include a cutout 54 which enables the slide plate assembly 36 to pass underneath it, as shown in FIG. 3.

Also shown in FIG. 3, the body 30 includes an arm portion 58 for attachment of the second pivot assembly 56. The arm portion 58 may extend beyond the base 12, generally in a downward direction when mounted, toward the tripod. A flange 70 may extend from an end of the arm portion 58, and may be a substantially planar component, in a plane substantially parallel to a plane of the connection plate 20, as seen in FIGS. 2 and 4.

The platform 16 is fixed with respect to the body 30 of the first pivot assembly 28 from rotation about the Y-Y axis, as seen in FIG. 1. Thus, the platform 16 rotates with the body 30 about the Y-Y axis. Manual manipulation of the knob 34 of the linear adjustment assembly may cause pivotal movement of the platform 16 and thus an optical component.

The threads of the linear adjustment assembly of the first pivot assembly 28 may be configured to enable precise adjustment of the platform 16 about the Y axis. For example, the threads of the threaded rod 32 and attachment element 40 may be configured so that threaded rod 32 must be turned fifty revolutions for the platform 16 to rotate 90 degrees. Other revolution ratios between the threaded rod 32 and the platform 16 are within the scope of the present invention, for this and other embodiments described herein.

The body 30 and the slide plate 42 may be formed of any suitable material. Such material may be selected for low density and high strength. Suitable materials may include a metal such as aluminum, a metal alloy, a polymer or a polymer blend.

The slide plate assembly 36 may optionally include a wheel 18 configured for transferring the compressing force of pin 44 into slot 26 onto the connection plate 20, rather than the slide plate 42 scraping on the connection plate 20. The wheel 18 may be aligned to rotate and move axially along the length of the threaded rod 32 with the attachment element 40.

Figure 7:
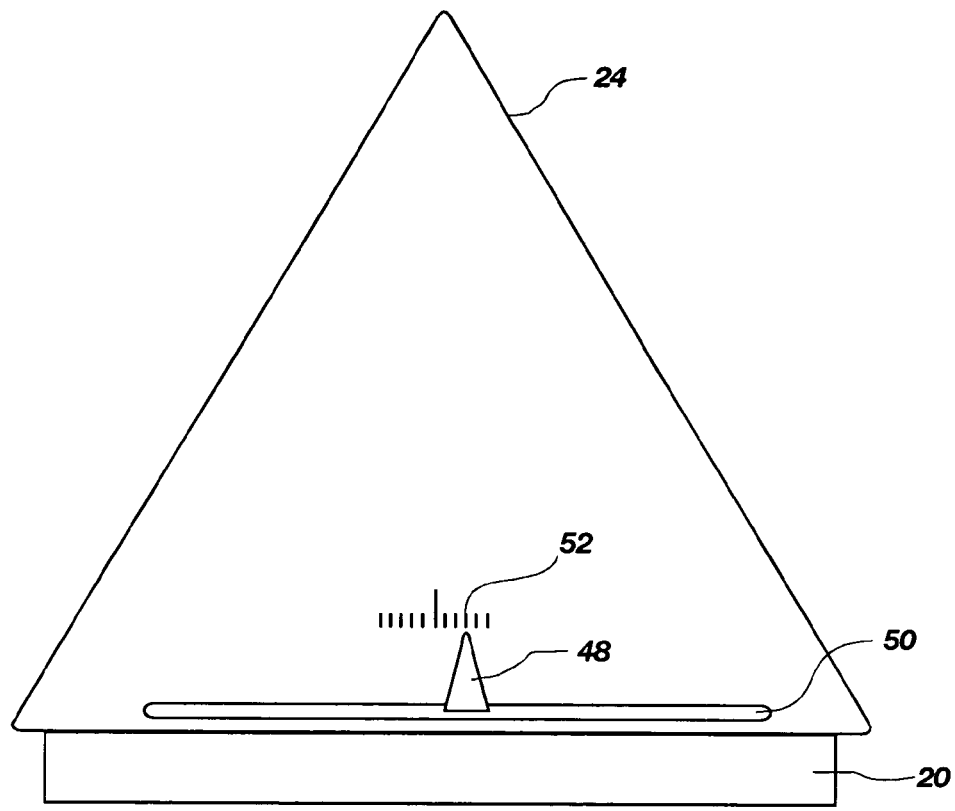
FIG. 7 is a front view of the base of the tripod head shown in FIGS. 1-3.

The slide plate assembly 36 may also include a position indicator 48, as shown in FIGS. 3, 5-7. The indicator 48 may extend from the attachment element 40 or the frame 78 of the slide plate assembly 36 through a slot 50 of the rib 24, as shown in FIGS. 3 and 7. As the knob 34 is rotated and the attachment element 40 moves axially along the threaded rod 32, the indicator 48 moves linearly along a position display 52 on the rib 24, as shown in FIG. 7. As described hereinabove, the linear movement of the attachment element 40 and slide plate assembly 36 initiates pivotal movement of the body 30 and the platform 16 about the Y axis. The indicator 48 thus indicates the angular position of the platform 16 relative to the Y-Y axis. Thus, the angular position of the platform 16 may be indicated as a horizontal or x coordinate of a Cartesian coordinate system.

Figure 8:
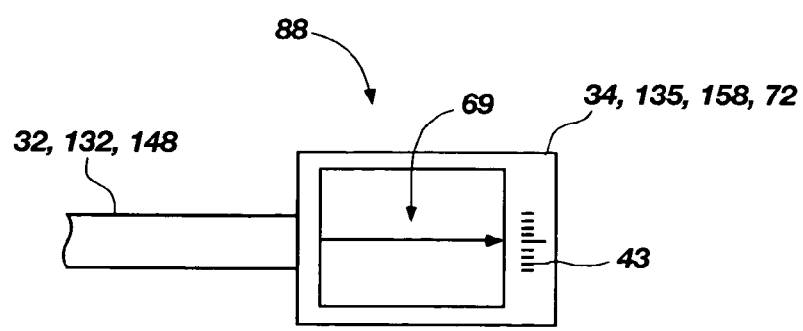
FIG. 8 is a top view of a position indicator of a tripod head of the present invention.

FIG. 8 shows another position indicator 88, which is incorporated into the knob 34. As the knob 34 is turned, causing the body 30 and thus the platform 16 to rotate about the Y axis, the position indicator 88 indicates the position of the platform 16 relative to the Y-Y axis. Circumferential markings 43 on the knob 34 may align with a pointer 69 affixed to the base 12. Thus, the angular position of the platform 16 may be indicated as a horizontal or x coordinate of a Cartesian coordinate system. The position indicator 88 may be configured to indicate the number of rotations of the knob 34. The position indicator 88 may be useful as an alternative to the position indicator 48 of FIGS. 3, 5-7, or may be used in conjunction therewith. A position indicator 88 having markings or an indicator scale fixed from rotation with respect to the knob 34, and a pointer 69, which rotates with the knob 34 to indicate position, are within the scope of the present invention.

Figure 9:
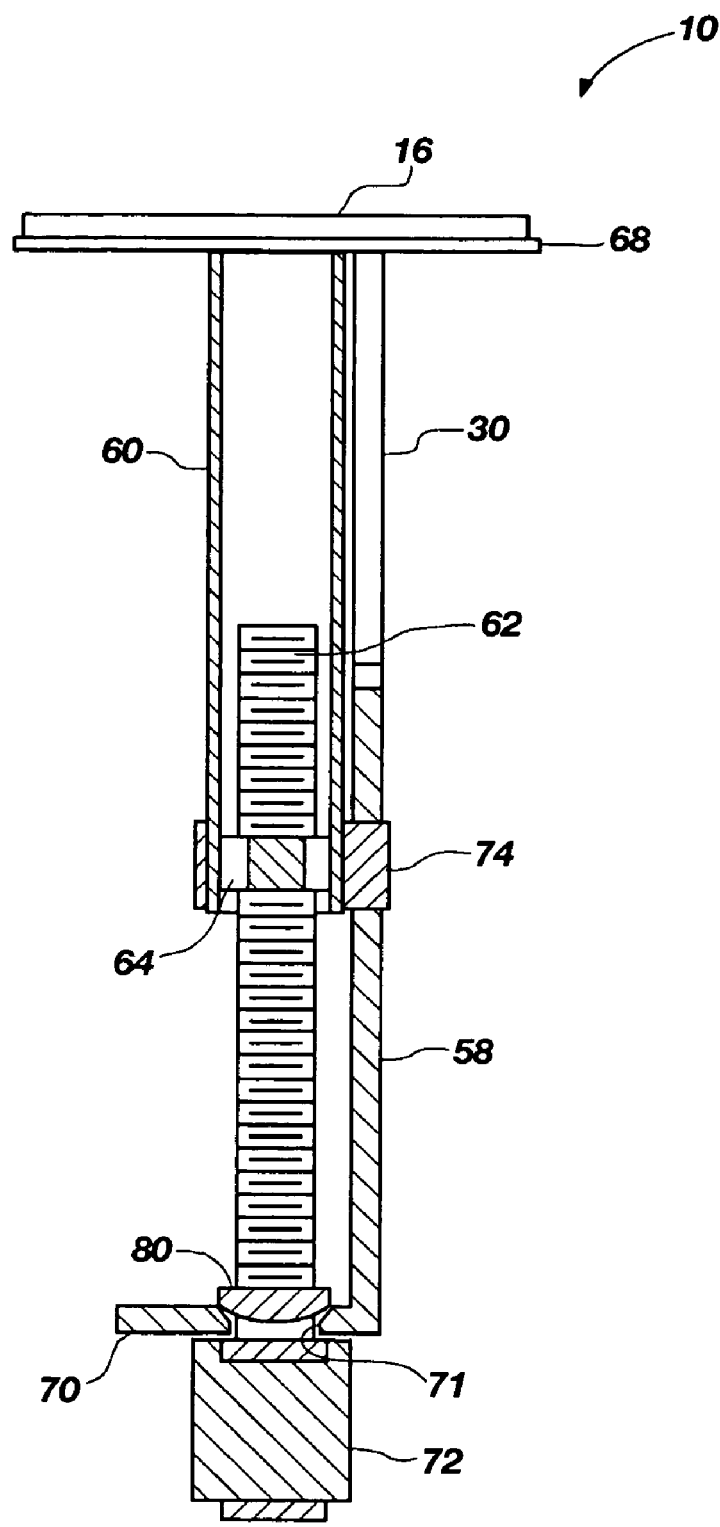
FIG. 9 is a cross-sectional view of the tripod head shown in FIGS. 1-3 taken along line 9-9 of FIG. 3.

Referring to FIGS. 1 through 3 and 9, the tripod head 10 may further include a second pivot assembly 56 that enables the platform 16 to pivot or tilt about the second tilting axis X-X. The second tilting axis may be positioned at an X-X joint 66 between the body 30 of the first pivot assembly 28 and the platform 16. Under a force from the second pivot assembly 56, the platform 16 may pivot with respect to the body 30 of the first pivot assembly 28, about the X-X joint 66. The second pivot assembly 56 may comprise a linear adjustment assembly including a body 60, a threaded rod 62, and an attachment element 64 (FIG. 9). The body 60 of the second pivot assembly 56, depicted in FIGS. 2 and 3, may be pivotally attached to the end of the platform 16 by a joint 68, which may be at an opposite end of the platform 16 from the X-X joint 66. The joint 68 enables the body 60 to adjust about a substantially horizontal axis through the center of the joint 68.

The body 60 may comprise a cylindrical tube that extends from the platform 16 in a direction generally toward the flange 70. The body 60 may be cylindrical, or any other shape providing an attachment between the platform 16 and an attachment element 64 on the threaded rod 62.

The threaded rod 62, as seen in FIG. 9 may extend through a hole 71 in the flange 70 of the body 30 of the first pivot assembly 28. The hole 71 of the flange 70 may be beveled. A rounded nut or washer 80 may be rigidly attached to the threaded rod 62 proximate the beveled hole 71 of the flange 70. Thus, as the angle of the body 60 and the threaded rod 62 changes with the movement of the platform 16, the threaded rod 62 may shift in the beveled hole 71. The beveled hole 71 enables an adjustable attachment between the first pivot assembly 28 and the second pivot assembly 56.

A knob 72 may be attached to the end of the threaded rod 62 coupled to the flange 70. When turned, the knob 72 rotates the threaded rod 62. An attachment element 64, for example a nut, configured with threads to correspond to the threads of the threaded rod 62 couples the threaded rod 62 to the body 60. The attachment element 64 is rigidly attached to the body 60 as seen in FIG. 9. As the knob 72 is turned, the attachment element 64 and the body 60 move axially along the length of the threaded rod 62. As the body 60 moves along the threaded rod 62, the platform 16 pivots accordingly about the X-X axis through the X-X joint 66 (see FIG. 1). The body 60 also pivots at its end attached to the platform 16 about the joint 68, as it moves along the threaded rod 62. The beveled hole 71 of the flange 70 and the cupped washer 80 act like a ball and socket joint and enable the threaded rod 62 to adjust accordingly as the body 60 rotates about the joint 68.

The second pivot assembly 56 may be configured to enable precise adjustment of the platform 16 about the X-X axis. For example, the threads of the threaded rod 62 and attachment element 64 can be configured so that threaded rod 62 and the attachment element 64 must be turned 50 revolutions for the platform 16 to rotate 90 degrees.

The second pivot assembly 56 may also include a position indicator 74, as shown in FIGS. 1, 3, and 9. The indicator 74 may extend from the body 60 around the arm portion 58 of the body 30 of the first pivot assembly 28. As the knob 72 is turned and the platform 16 is rotated about the X-X axis, the indicator 74 moves with the body 60. The indicator 74 may move along a position display 76 on the arm portion 58, as shown in FIGS. 1 and 3. The position display 76 may comprise a plurality of graduated markings. The indicator 74 may point to or indicate the angular position of the platform 16 relative to the X-X axis or indicate a vertical or y coordinate of a Cartesian coordinate system. Alternatively, the position indicator 74 of the second pivot assembly 56 may be incorporated into the knob 72, similar to the position indicator 88 shown in FIG. 8.

The first and second pivot assemblies 28 and 56 and the position indicators 48 and 74 enable the exact position of the platform 16 of the tripod head 10 to be referenced, as elements of a Cartesian coordinate system. This enables a user to reference the location of a target and easily return to it when desired.

Figure 10:
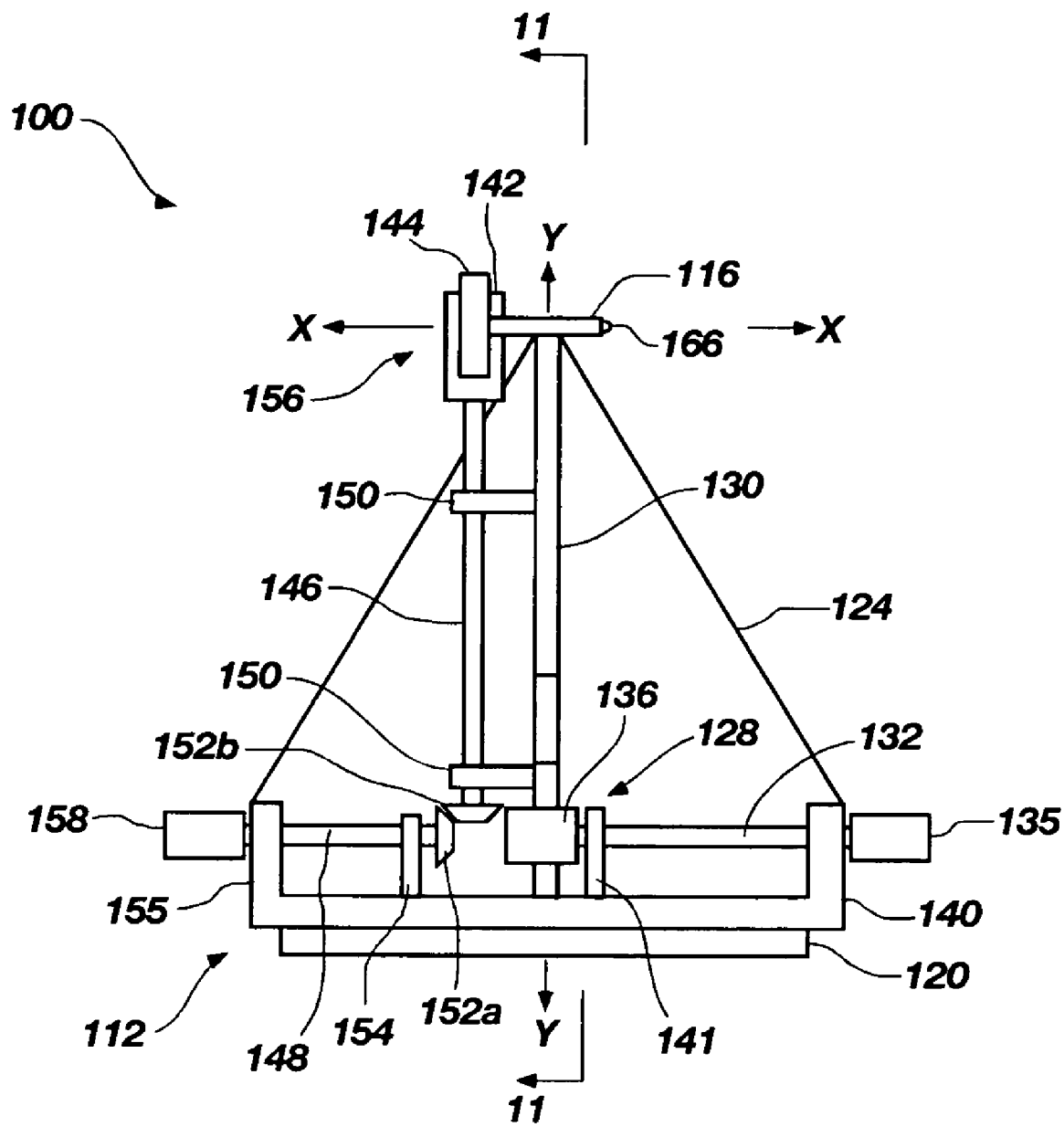
FIG. 10 is an end view of another embodiment of a tripod head of the present invention.
Figure 11:
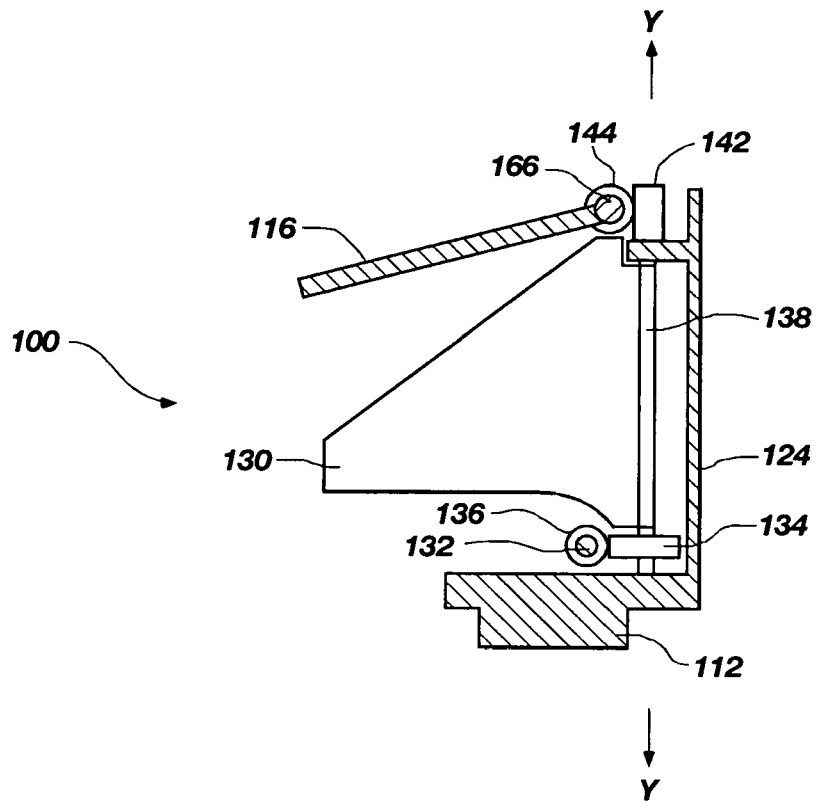
FIG. 11 is a cross-sectional view of the tripod head shown in FIG. 10 taken along line 11-11 of FIG. 10.

While the tripod head shown in FIGS. 1 through 9 includes threaded rods and attachment elements used to pan and tilt a platform about two mutually perpendicular axes, the tripod head of the present invention is not so limited and may contain other mechanisms to pan and tilt the platform. Another embodiment of a tripod head 100 that embodies teachings of the present invention is shown in FIGS. 10 and 11. The tripod head 100 may include a base 112 and a connection plate 120 configured for connection to a tripod or other support. The connection plate 120 may comprise a threaded hole configured to receive a protruding screw of the tripod. The connection plate 120 mechanism may comprise any other mechanism for mounting a tripod head, such as, for example a clamping mechanism. The base 112 may also include a rib 124 that extends away from the connection plate 120.

The tripod head 100 may also include a platform 116 for supporting an optical device such as a camera, spotting scope, binoculars, camcorder, or telescope. The platform 116 may include a universal connection (not shown). The universal connection may include a hole or a slot configured to receive a commercially available camera or scope mounting plate. Such camera or scope plates are sold by, for example, Gruppo Manfrotto of Bassano del Grappa, Italy. Alternatively, the universal connection may include a threaded screw protruding from the platform 116.

The platform 116 is mounted on the base 112 with pivot assemblies to enable independent pivotal movement of the platform 116 about each one of a pair of first and second mutually perpendicular axes. The platform 116 and any optical device mounted on the platform 116 may be pivoted independently of the base 112 and any tripod or support structure upon which the base 112 is mounted, to a desired spatial orientation in order to view an object or point of interest.

Figure 12:
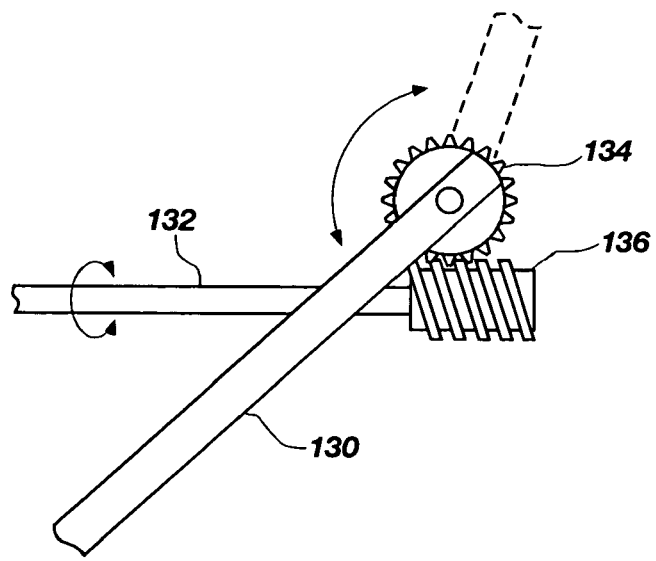
FIG. 12 depicts a portion of the pivot assembly of the tripod head of FIG. 10.

A first pivot assembly 128 of the tripod head 100 is configured to pivot or pan the platform 116 about a Y-Y axis, and a second pivot assembly 156 is configured to pivot or tilt the platform 116 about an X-X axis. The first pivot assembly 128 may comprise a worm screw assembly including a body 130, a worm gear 136, a worm wheel 134, and a shaft 132, as depicted in FIGS. 10-12.

The body 130 of the first pivot assembly 128 may be pivotally attached to the base 112 with a joint 138, enabling it to pivot or rotate about the Y axis. The joint 138 may be attached to a rib 124 of the base 112. The platform 116 may be attached to body 130 with a joint configured to enable the platform 116 to rotate with the body 130 about the Y-Y axis.

A shaft 132 with a knob 135 for manual manipulation thereof may be coupled to the base 112 by support brackets 140, 141, which may include bearings, bushings, or the like. The bearings in the support brackets 140, 141 enable the shaft 132 to be rotated about an axis substantially perpendicular to the Y-Y axis. The angular position of the body 130 and thus the platform 116 may be precisely panned about the Y-Y axis by rotating the shaft 132 which rotates the worm gear 136, and turning the worm wheel 134.

The worm wheel 134 may be matingly engaged with the worm gear 136 for rotation thereof. The worm wheel 134 may be configured to drive the body 130 in pivotal motion about the joint 138. For example, the body 130 may be fixed to the worm wheel 134 directly, or the body 130 may be fixed to a shaft configured to rotate with the worm wheel 134.

In order to enable precise adjustment of the body 130, and therefore the platform 116, about the Y axis the worm gear 136 and the worm wheel 134 may be configured with a gear reduction. For example, a reduction ratio of 1:100 could be configured so that shaft 132 and the worm gear 136 must be turned 25 revolutions for the platform 116 to rotate 90 degrees. Other revolution ratios between the shaft 132 and the platform 116 are within the scope of the present invention.

The knob 135 on the shaft 132 may include a position indicator 88 as described hereinabove and shown in FIG. 8. As the knob 135 is turned, causing the body 130 and thus the platform 116 to rotate about the Y-Y axis, the position indicator 88 indicates the position of the platform 116 relative to the Y-Y axis. Circumferential markings 43 on the knob 135 may align with a pointer 69 affixed to the base 112. Thus, the angular position of the platform 116 may be indicated as a horizontal or x coordinate of a Cartesian coordinate system. The position indicator 88 may be configured to indicate the number of rotations of the knob 135.

The second pivot assembly 156 may comprise a worm gear assembly including a worm gear 142, a worm wheel 144, a first shaft 146, and a second shaft 148, as depicted in FIGS. 10 and 11.

The worm wheel 144 may be fixedly attached to the platform 116. The worm gear 142 is attached to the worm wheel 144 for rotation thereof. The platform 116 and the body 130 may be attached with a joint 166, enabling the platform 116 to pivot about the X-X axis while the body 130 does not. A first shaft 146 extends from the worm gear 142 toward the base 112, substantially parallel to the body 130 of the first pivot assembly 128. The first shaft 146 is coupled to the body 130 of the first pivot assembly 128 by support brackets 150, which may comprise, for example, bearings, or bushings. Two support brackets 150, located proximate the ends of the first shaft 146, couple the first shaft 146 to the body 130. The bearings in the support brackets 150 enable the first shaft 146 to be rotated about an axis substantially perpendicularly to the X-X axis. The first shaft 146 is attached to the body 130, and the worm wheel 144 is connected to the platform 116. As the body 130 of the first pivot assembly 128 rotates about the Y-Y axis, the first shaft 146 and the worm wheel 144 rotate with it.

A pair of bevel gears 152a, 152b couple the first shaft 146 to a mutually orthogonal second shaft 148. The second shaft 148 may extend over the base 112. The bevel gear 152a attached to the proximal end of the second shaft 148 may be biased against the bevel gear 152b attached to the end of the first shaft 146 by a spring (not shown) or other suitable means. The bias on the bevel gear 152a may enable the bevel gear 152a to remain engaged with bevel gear 152b as the bevel gear 152b and the first shaft 146 rotate about the Y axis with the body 130 of the first pivot assembly 128.

The second shaft 148 may be coupled to the base 112 with a support bracket 154, which may comprise, for example, bearings or bushings, at the end proximate the bevel gear 152a. A flange 155 of the base 112 may include, for example, bearings or bushings and receive the second shaft 148 therethrough. The bearings in the support bracket 154 and the flange 155 may enable the second shaft 148 to be rotated about an axis substantially perpendicular to the Y-Y axis.

A knob 158 may be attached to the end of the second shaft 148 that extends through the flange 155. The knob 158 may be manually manipulated, or turned to rotate the second shaft 148. The angular position of the platform 116 may be precisely tilted about the X-X axis by rotating the second shaft 148, causing the first shaft 146 to rotate, which in turn causes the worm gear 142 and the worm wheel 144 to rotate, which rotates the platform 116 about the X-X axis.

For precise adjustment of the platform 116 about the X-axis, the worm gear 142 and the worm wheel 144 may be configured with a gear reduction. For example, a reduction ratio of 1:50 could be configured so that the second shaft 148 must be turned 50 revolutions for the platform 116 to rotate through one revolution.

The knob 158 may include a position indicator 88 as described above and shown in FIG. 8. As the knob 158 is turned, causing the shaft 148 and thus the platform 116 to rotate about the X-X axis, the position indicator 88 indicates the position of the platform 116 relative to the X-X axis. Circumferential markings 43 on the knob 158 may align with a pointer 69 affixed to the base 112. Thus, the angular position of the platform 116 may be indicated as a vertical or y coordinate of a Cartesian coordinate system. The position indicator 88 may be configured to indicate the number of rotations of the knob 158.

Figure 13:
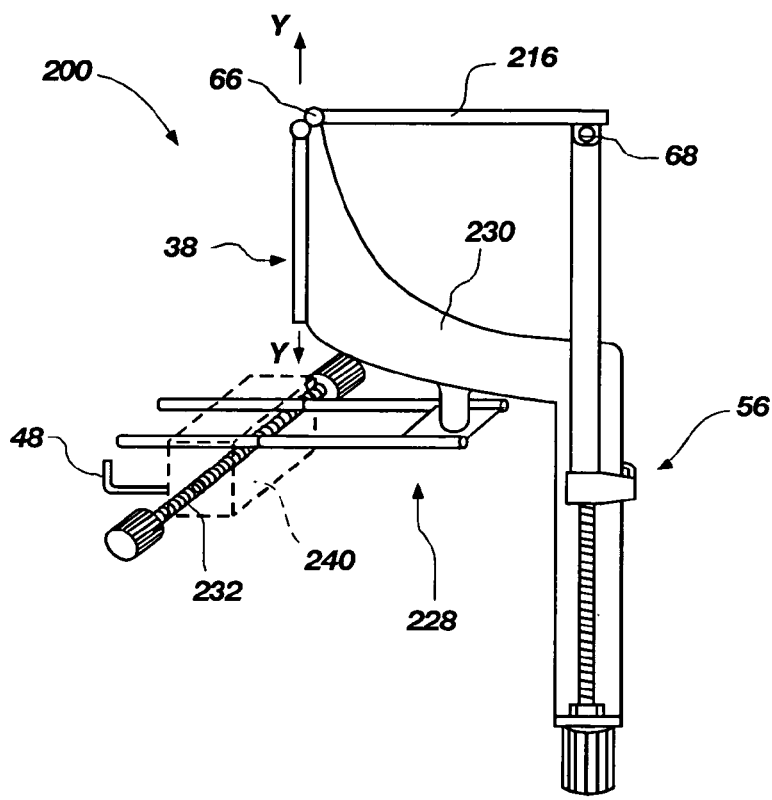
FIG. 13 depicts another embodiment of a tripod head of the present invention.
Figure 14:
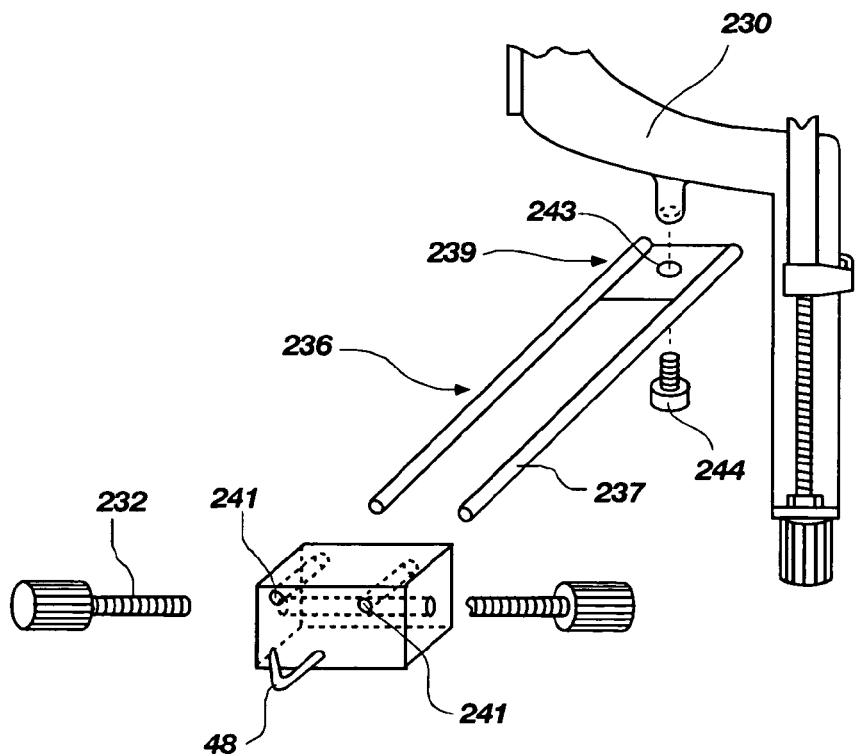
FIG. 14 depicts an exploded view of portions of the tripod head of FIG. 13.

Another embodiment of a mounting head 200 of the present invention is shown in FIGS. 13 and 14. The mounting head 200 is shown without a base for clarity. The mounting head 200 may include a first pivot assembly 228, a second pivot assembly 56, and a platform 216. The second pivot assembly 56 may be substantially similar to the second pivot assembly of the tripod head 10 depicted in FIG. 2. The first pivot assembly 228 may include a linear adjustment assembly comprising a threaded rod 232, an attachment block 240 (shown in phantom), and a translation fork 236. The threaded rod 232 may be manually manipulated to rotate, and the attachment block 240 may be moved axially along the threaded rod 232. The attachment block 240 may include apertures 241 therethrough, configured for receiving the tines 237 of the translation fork 236. The tines 237 and the apertures 241 may be substantially smooth.

The translation fork 236 may include a head 239 joining the tines 237. The head 239 may include an aperture 243, and an attachment element 244 may join the body 230 of the first pivot assembly 228 and the head 239 of the translation fork 236. Other components may be used to join the body 230 and the translation fork 236. For example, either the body 230 or the head 239 of translation fork 236 may include a protruding component to be received by an aperture in the other. The joint between the head 239 of the translation fork 236 and the body 230 may enable the head 239 and the body 230 to pivot with respect to one another.

In use, rotational movement of the threaded rod 232 may drive the body 230 to pivot about the Y-Y axis through the force applied at the joint between the head 239 of the translation fork 236 and the body 230.

The attachment block 240 may further include lubrication holes. The lubrication holes may be positioned to provide lubrication to the apertures 241 configured for receiving the tines 237, and a threaded aperture configured for receiving the threaded rod 232.

The attachment block 240 may also include a position indicator 48 protruding therefrom. Turning to FIG. 7, the position indicator 48 may extend through a slot 50 of the rib 24, similar to the position indicator 48 shown in FIG. 7.

A mounting head including position indicators, as described hereinabove, enables a user to methodically search an area using an X/Y grid system. As long as the 0/0 point is maintained, the user may easily return the mounting head, and therefore their optical device, to a referenced X, Y location.

Figure 15:
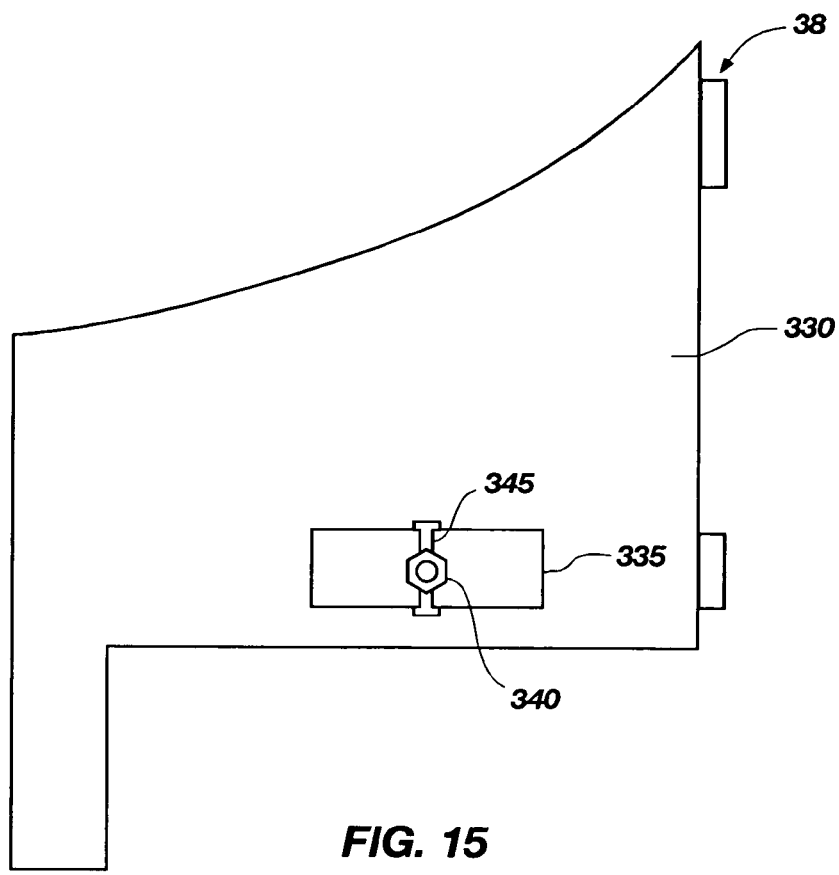
FIG. 15 depicts components of still another embodiment of a tripod head of the present invention.
Figure 16A:
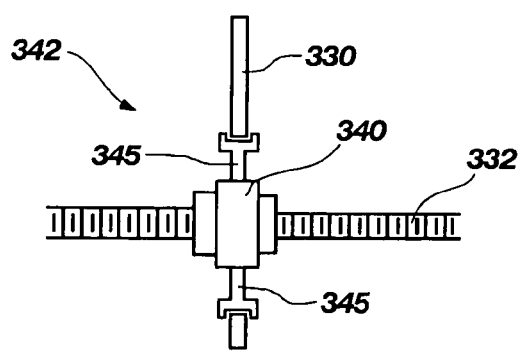
FIG. 16A depicts a cross-sectional view of the components of FIG. 15.

FIGS. 15 and 16A depict another embodiment of a body 330 which may be used as the body of the first pivot assembly 28 of the mounting head 10 of FIG. 1. The body 330 includes an opening 335 therethrough. The threaded rod 332 may pass through the opening 335. The body 330 may be pivotally attached to the threaded rod 332 with a frame assembly 342. The frame assembly 342 may include an attachment element 340 on the threaded rod 332. The attachment element 340 may comprise, for example, a nut, or other structure with internal threads configured to matingly engage with the threads of the threaded rod 332. The attachment element 340 is fixed from rotation with respect to the threaded rod 332. As the threaded rod 332 is rotated, the attachment element 340 and thus the body 330 move axially along the length of the threaded rod 332.

Figure 16B:
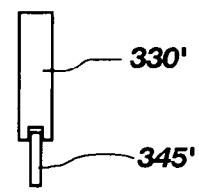
FIG. 16B illustrates a variation of some of the components of FIG. 16A.

The frame assembly 342 may further include pins 345 which protrude from the attachment element 340. The pins 345 may be pivotally mounted on the attachment element 340. The pins 345 may be movably connected to the body 330. For example, the pins 345 may have a Y-shape at distal ends thereof to enable the pins 345 to cup the body 330 and translate the movement of the attachment element 340 thereto. The movement (axially along the length of the threaded rod 332) of the attachment element 340 and pins 345 urges the body 330 to pivot about the joint 38. The pivotal movement of the body 330 changes which portion of the body 330 is aligned over the threaded rod 332. Thus, the body 330 may slide or adjust on the pins 345 (radially, with respect to the threaded rod 332). The distal ends of the pins 345 may be Y-shaped to form a track which the body 330 slides on. Alternatively, the body 330' may comprise a track or channel which enables adjustment with respect to the pins 345' as shown in FIG. 16B. The pins 345 need not be pivotally mounted on the attachment element 340 if the connection between the pins 345' and the body 330' enables the pins 345' to pivot with respect to the body 330', as shown in FIG. 16B.

The frame assembly 342 may include pins 345 extending from a top surface and a bottom surface of the attachment element 340, as shown. Frame assemblies having only one pin 345, or pins extending from a side surface of the attachment element 340 toward the body 330 are also within the scope of the present invention. The body 330 need not include an opening 335 if used in conjunction with a frame assembly having only one pin 345.

Figure 17:
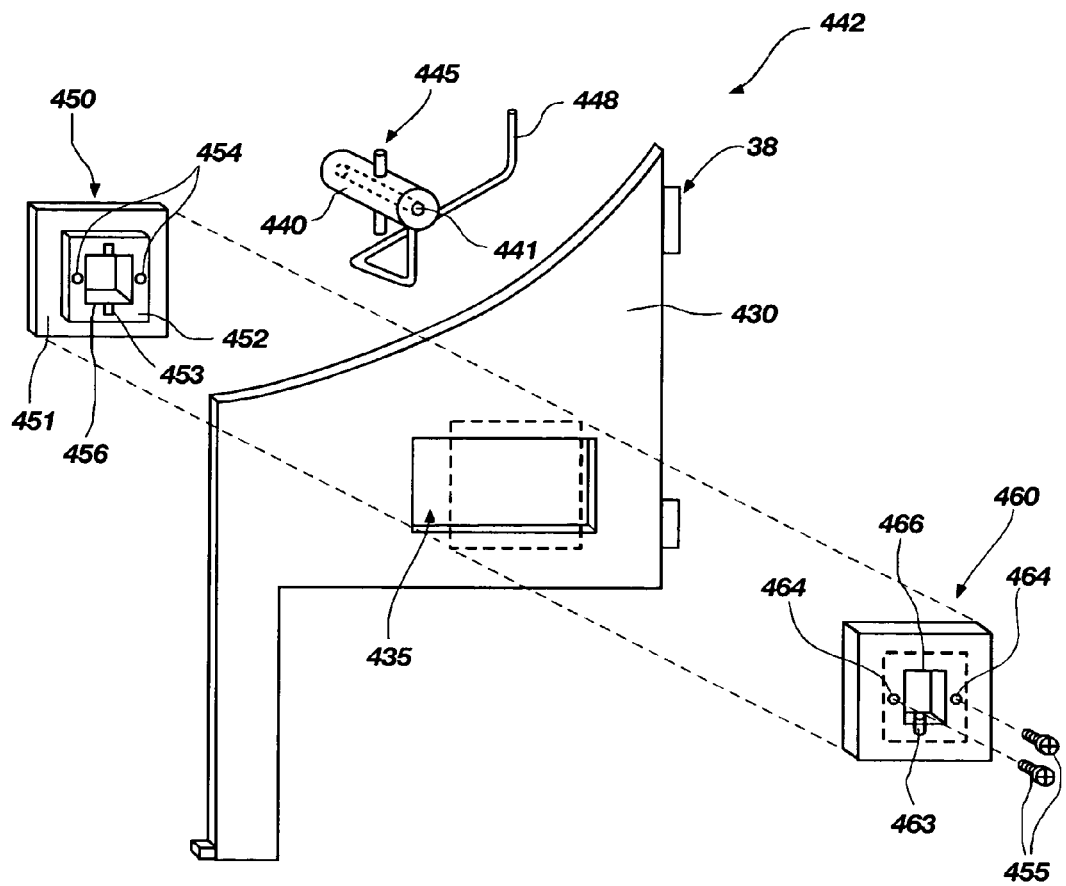
FIG. 17 depicts an exploded view of components of still another embodiment of a tripod head of the present invention.
Figure 18:
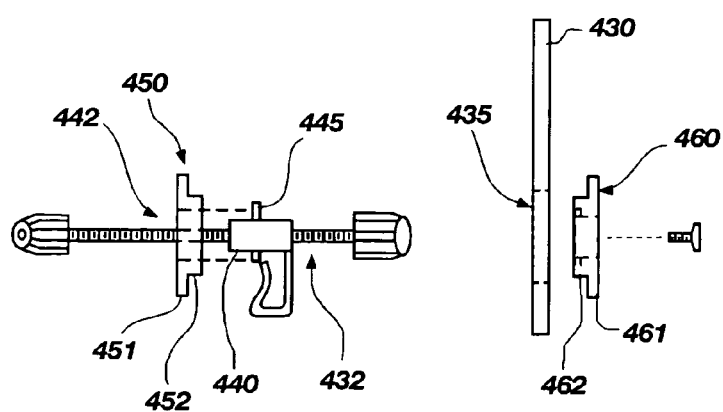
FIG. 18 depicts a side view of the components of FIG. 17.

FIGS. 17 and 18 depict another embodiment of a body 430 which may be used as the body of the first pivot assembly 28 of the mounting head 10 of FIG. 1. The body 430 includes an opening 435 therethrough. The threaded rod 432 may pass through the opening 435. The body 430 may be movably attached to the threaded rod 432 with a clamping assembly 442. The clamping assembly 442 may include an attachment element 440 on the threaded rod 432. The attachment element 440 may comprise, for example, a nut, or other structure with an aperture 441 therethrough having internal threads configured to matingly engage with the threads of the threaded rod 432. The attachment element 440 is fixed from rotation with respect to the threaded rod 432. As the threaded rod 432 is rotated, the attachment element 440 and thus the body 430 move axially along the length of the threaded rod 432.

The attachment element 440 may also include a position indicator 448 protruding therefrom. Turning to FIG. 7, the position indicator 448 may extend through a slot 50 of the rib 24, similar to the position indicator 48 shown in FIG. 7.

Returning to FIGS. 17 and 18, clamping assembly 442 may further include pins 445 which protrude from the attachment element 440. The pins 445 may be movably connected to the body 430 between a first clamping frame 450 and a second clamping frame 460. Each clamping frame 450, 460 may include an outside portion 451, 461 and an inner, protruding portion 452, 462. The clamping frames 450, 460 may be clamped together with attachment elements 455, for example, bolts, rivets, pins or screws, through attachment holes 454, 464. The clamping frames 450, 460 may be clamped together with the inner, protruding portions 452, 462 facing one another. The inner, protruding portions 452, 462 may be received by the opening 435 through the body 430. The outside portions 451, 461 of the clamping frames 450, 460 may encase the body 430 above and below the opening 435. When clamped together, the clamping frames 450, 460 form an "H" shape, with the inner, protruding portions 452, 462 comprising the horizontal bar of the "H" shape, and the outside portions 451, 461 comprising the arms and the legs of the "H" shape. The inner, protruding portions 452, 462 pass through the opening 435. The body 430 above the opening 435 may be received by the arms of the "H" shape, and the body 430 below the opening 435 may be received by the legs of the "H" shape. The clamping frames 450, 460 are slidable within the opening 435.

Each clamping frame 450, 460 may further include an opening 456, 466 therethrough. The threaded rod 432 may pass through the openings 456, 466. The attachment element 440 may be received within the openings 456, 466 of the clamping frames 450, 460, with the protruding pins 445 of the attachment element 440 received within cavities 453, 463 of the clamping frames 450, 460.

The movement (axially along the length of the threaded rod 432) of the attachment element 440 and pins 445 is transferred through the clamping frames 450, 460 to the body 430, urging the body 430 to pivot about the joint 38. The pivotal movement of the body 430 changes which portion of the body 430 is aligned over the threaded rod 432. Thus, the body 430 may slide or adjust on the clamping frames 450, 460 (radially, with respect to the threaded rod 432). The "H" shape of the clamping frames 450, 460 form a track which the body 430 slides on. As the attachment element 440 moves on the threaded rod 432 and the body 430 pivots about the joint 38, the position of the clamping frames 450, 460 will shift within the opening 435 of the body 430.

Figure 19:
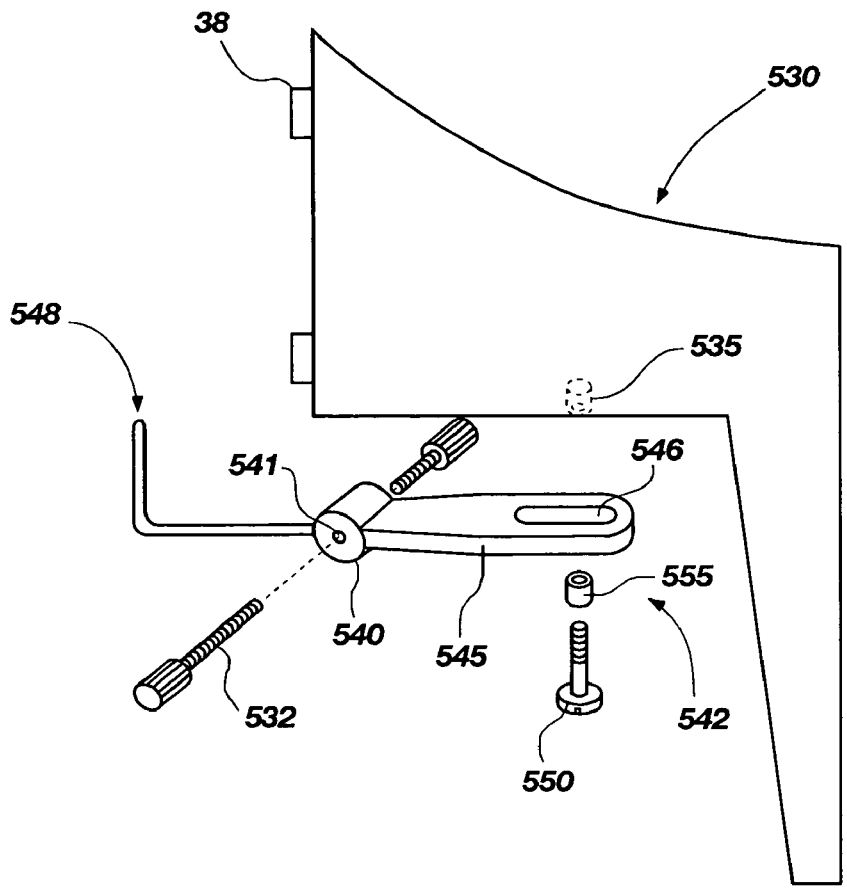
FIG. 19 depicts an exploded view of components of still another embodiment of a tripod head of the present invention.

FIG. 19 depicts another embodiment of a body 530 which may be used as the body of the first pivot assembly 28 of the mounting head 10 of FIG. 1. The body 530 includes a cavity 535 therein. The body 530 may be movably attached to a threaded rod 532 with a slot assembly 542. The slot assembly 542 may include an attachment element 540 on the threaded rod 532. The attachment element 540 may comprise, for example, a nut, or other structure with an aperture 541 therethrough having internal threads configured to matingly engage with the threads of the threaded rod 532. The attachment element 540 is fixed from rotation with respect to the threaded rod 532. As the threaded rod 532 is rotated, the attachment element 540 and thus the body 530 move axially along the length of the threaded rod 532.

The attachment element 540 may also include a position indicator 548 protruding therefrom. Turning to FIG. 7, the position indicator 548 may extend through a slot 50 of the rib 24, similar to the position indicator 48 shown in FIG. 7.

Returning to FIG. 19, the slot assembly 542 may further include a translation body 545 which protrudes from the attachment element 540, opposite from the position indicator 548. The translation body 545 may include a slot 546 through which a coupling element 550, for example, a screw, bolt or pin, may pass. A bushing 555 disposed about the coupling element 550 may enable the coupling element 550 to slide within the slot 546. The coupling element 550 may be pivotally connected to the body 530 at the cavity 535.

The movement (axially along the length of the threaded rod 532) of the attachment element 540 is transferred through the translation body 545 and coupling element 550 to the body 530, urging the body 530 to pivot about the joint 38. The pivotal movement of the body 530 changes which portion of the translation element slot 546 is aligned with the cavity 535 of the body 530. The coupling element 550 may slide or adjust within the slot 546 (radially, with respect to the threaded rod 532). As the attachment element 540 moves on the threaded rod 532 and the body 530 pivots about the joint 38, the bushing 555 and the coupling element 550 will shift position within the slot 546 of the translation body 545.

Figure 20:
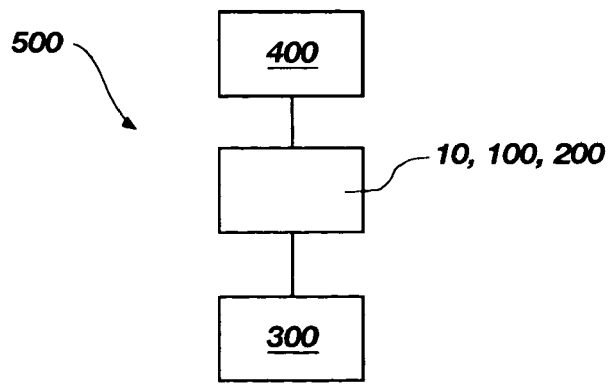
FIG. 20 depicts an embodiment of an assembly of the present invention.

FIG. 20 shows an assembly 500 including an embodiment of a mounting head 10, 100, 200 of the present invention attached to a supporting structure 300. The supporting structure 300 may include, for example, a tripod, an air, land, or sea vehicle, a building, a wall, or any other suitable supporting structure. An optical device 400, for example, a camera, a spotting scope, binoculars, a telescope, or any other suitable optical device may be attached to the mounting head 10, 100, 200. Assemblies 500 including an embodiment of a mounting head of the present invention are encompassed by the present invention.

Although the foregoing description contains many specifics, these are not to be construed as limiting the scope of the present invention, but merely as providing certain illustrative embodiments. Similarly, other embodiments can be devised that do not depart from the spirit or scope of the present invention. The scope is, therefore, indicated and limited only by the appended claims and their legal equivalents and not by the foregoing description. All additions, deletions, and modifications to the invention, as disclosed herein, which fall within the meaning and scope of the claims, are encompassed by the present invention.

What is claimed is:

1. A mounting head comprising:
a base;
a first pivot assembly mounted on the base and configured for converting rotational to linear movement and for pivoting a body thereof about a first axis;
a platform attached to the body of the first pivot assembly, the platform configured for attaching an optical device thereto;
at least a second pivot assembly attached to the body of the first pivot assembly and configured for converting rotational to linear movement and for pivoting the platform about at least a second axis, the at least a second axis being substantially orthogonal to the first axis;
a first position indicator configured for indicating a linear position of a portion of the first pivot assembly; and
at least a second position indicator configured for indicating a linear position of a portion of the second pivot assembly;
wherein at least one of the first position indicator and the at least a second position indicator comprises a pointer configured to move linearly along a linear position display as the platform is rotated about either the first axis or the at least a second axis.

2. The mounting head of claim 1, wherein at least one of the first position indicator and the at least a second position indicator indicates a rotational position of a knob of the first pivot assembly or the second pivot assembly.

3. A mounting head comprising:
a base;
a first pivot assembly mounted on the base and configured for converting rotational to linear movement and for pivoting a body thereof about a first axis, the first pivot assembly including a threaded rod and at least one attachment element, wherein the first pivot assembly further comprises:
a slide plate assembly attached to the at least one attachment element, comprising:
a slide plate with a substantially planar surface; and
a pin protruding from the substantially planar surface of the slide plate;
a joint extending generally in a direction perpendicular to a plane of a substantially planar surface of the base, wherein the joint pivotally attaches the body of the first pivot assembly to a rib of the base; and
a slot of the body, configured for matingly engaging with the pin of the slide plate assembly;
a platform attached to the body of the first pivot assembly, the platform configured for attaching an optical device thereto; and
at least a second pivot assembly attached to the body of the first pivot assembly and configured for converting rotational to linear movement and for pivoting the platform about at least a second axis, the at least a second axis being substantially orthogonal to the first axis.

4. The mounting head of claim 3, wherein the body of the first pivot assembly further comprises:
an arm portion; and
a flange portion extending from the arm portion.

5. A mounting head comprising:
a base;
a first pivot assembly mounted on the base and configured for converting rotational to linear movement and for pivoting a body thereof about a first axis, the first pivot assembly including a threaded rod and at least one attachment element, wherein the first pivot assembly further comprises at least one pin extending from the at least one attachment element and slidably coupled with the body;
a platform attached to the body of the first pivot assembly, the platform configured for attaching an optical device thereto; and
at least a second pivot assembly attached to the body of the first pivot assembly and configured for converting rotational to linear movement and for pivoting the platform about at least a second axis, the at least a second axis being substantially orthogonal to the first axis.

6. A mounting head comprising:
a base;
a first pivot assembly mounted on the base and configured for converting rotational to linear movement and for pivoting a body thereof about a first axis;
a platform attached to the body of the first pivot assembly, the platform configured for attaching an optical device thereto; and
at least a second pivot assembly attached to the body of the first pivot assembly and configured for converting rotational to linear movement and for pivoting the platform about at least a second axis, the at least a second axis being substantially orthogonal to the first axis, wherein the at least a second pivot assembly further comprises:
a joint connecting the second pivot assembly with the platform;
an elongated screw mounted through a beveled hole in a flange of the first pivot assembly;
at least one attachment element matingly engaged with the elongated screw; and
a body attached to the joint at one end and rigidly attached to the attachment element at an opposite end.

7. The mounting head of claim 6, wherein the platform is connected at one end to the joint of the at least a second pivot assembly and at the opposite end to another joint of the first pivot assembly.

8. A mounting head comprising:
a base;
a first pivot assembly configured for pivoting a body thereof about a first axis mounted on the base and including a first position indicator configured for indicating a linear position, wherein the first pivot assembly comprises:
a threaded rod and at least one attachment element movably coupled thereto;
a slide plate assembly attached to the at least one attachment element, comprising:
a slide plate with a substantially planar surface; and
a pin protruding from the substantially planar surface of the slide plate;
a joint extending generally in a direction perpendicular to a plane of a substantially planar surface of the base, wherein the joint pivotally attaches the body of the first pivot assembly to a rib of the base; and
a slot of the body, configured for matingly engaging with the pin of the slide plate assembly;
a platform attached to the body of the first pivot assembly, the platform configured for attaching an optical device thereto; and a second pivot assembly attached to the body of the first pivot assembly and configured for pivoting the platform about at least a second axis, the at least a second axis being substantially orthogonal to the first axis, and the second pivot assembly including a second position indicator configured for indicating a second linear position, the first linear position and the second linear position being associated with a position of the platform.

9. The mounting head of claim 8, wherein the first pivot assembly is configured for converting rotational to linear movement.

10. The mounting head of claim 9, wherein the second pivot assembly is configured for converting rotational to linear movement.

11. A mounting head comprising:
   a base;
   a first pivot assembly configured for pivoting a body thereof about a first axis, mounted on the base and including a first position indicator configured for indicating a linear position;
   a platform attached to the body of the first pivot assembly, the platform configured for attaching an optical device thereto; and
      a second pivot assembly attached to the body of the first pivot assembly and configured for pivoting the platform about at least a second axis, the at least a second axis being substantially orthogonal to the first axis, and the second pivot assembly including a second position indicator configured for indicating a second linear position, the first linear position and the second linear position being associated with a position of the platform, wherein the second pivot assembly further comprises:
         a joint connecting the second pivot assembly with the platform;
         an elongated screw mounted through a beveled hole in a flange of the first pivot assembly;
         at least one attachment element matingly engaged with the elongated screw; and
         a body attached to the joint at one end and rigidly attached to the at least one attachment element at an opposite end.

12. The mounting head of claim 1, further comprising the optical device attached to the platform.

13. The mounting head of claim 3, further comprising the optical device attached to the platform.

14. The mounting head of claim 5, further comprising the optical device attached to the platform.

15. The mounting head of claim 6, further comprising the optical device attached to the platform.

16. The mounting head of claim 8, further comprising the optical device attached to the platform.

17. The mounting head of claim 11, further comprising the optical device attached to the platform.

* * * * *